(12) United States Patent
Cha

(10) Patent No.: US 10,767,709 B2
(45) Date of Patent: Sep. 8, 2020

(54) ELECTRONIC ACTUATOR FOR FAN CLUTCH

(71) Applicant: COOLING SYSTEM CO., LTD., Gimhae-si (KR)

(72) Inventor: Jung Ok Cha, Gimhae-si (KR)

(*) Notice: Subject to any disclaimer, the term of this patent is extended or adjusted under 35 U.S.C. 154(b) by 0 days.

(21) Appl. No.: 14/893,547

(22) PCT Filed: Jun. 11, 2014

(86) PCT No.: PCT/KR2014/005129
§ 371 (c)(1),
(2) Date: Jan. 6, 2016

(87) PCT Pub. No.: WO2014/204129
PCT Pub. Date: Dec. 24, 2014

(65) Prior Publication Data
US 2016/0116005 A1    Apr. 28, 2016

(30) Foreign Application Priority Data
Jun. 21, 2013    (KR) .................. 20-2013-0005026 U

(51) Int. Cl.
F16D 27/10    (2006.01)
F16D 27/112    (2006.01)
(Continued)

(52) U.S. Cl.
CPC .......... F16D 27/14 (2013.01); F16D 35/024 (2013.01); *F16D 27/112* (2013.01); *F16D 2027/008* (2013.01)

(58) Field of Classification Search
None
See application file for complete search history.

(56) References Cited

U.S. PATENT DOCUMENTS

| 6,557,686 | B1 | 5/2003 | Budd et al. |
| 2010/0044602 | A1* | 2/2010 | Boyer .................. F16D 35/023 251/129.02 |
| 2017/0241490 | A1* | 8/2017 | Krammer ............. F16D 35/024 |

FOREIGN PATENT DOCUMENTS

| KR | 10-2006-0052554 | 5/2006 |
| KR | 10-2008-0113531 | 12/2008 |
| KR | 10-2010-0053436 | 5/2010 |

OTHER PUBLICATIONS

English translation of 10-2010-0053436.
English translation of 10-2008-0113531.
English translation of 10-2006-0052554.

* cited by examiner

*Primary Examiner* — Charles A Fox
*Assistant Examiner* — Ryan P Dodd
(74) *Attorney, Agent, or Firm* — Antonio Ha & U.S. Patent, LLC

(57) ABSTRACT

An electronic actuator according to the present invention comprises: a shaft; a bobbin; a nut; an upper bushing; a housing; a bearing; and a lower bushing. The shaft rotates by receiving a rotational force from an engine crank shaft. The bobbin is mounted to surround the middle portion of the shaft, wherein the bobbin has a coil wound inside thereof. The nut is made of a magnetic material and mounted to surround one side in the longitudinal direction of the shaft, while being screw-connected to a clutch. The upper bushing is made of as nonmagnetic material and is press-fit between the one side in the longitudinal direction of the shaft and the nut, so as to connect the shaft and the nut to form a single body. The housing is made of a magnetic material and comprises a bottom plate and a side wall to surround the other side in the longitudinal direction of the shaft, wherein the side wall extends to partially overlap the nut. The bearing (Continued)

is mounted on the outer peripheral surface on the other side in the longitudinal direction of the shaft, positioned inside the housing. The lower bushing is made of a nonmagnetic material and is press-fit between the bearing and the housing so as to connect the bearing and the housing to form a single body.

7 Claims, 4 Drawing Sheets

(51) Int. Cl.
     *F16D 27/14*      (2006.01)
     *F16D 35/02*      (2006.01)
     *F16D 27/00*      (2006.01)

[Fig. 1] Prior Art
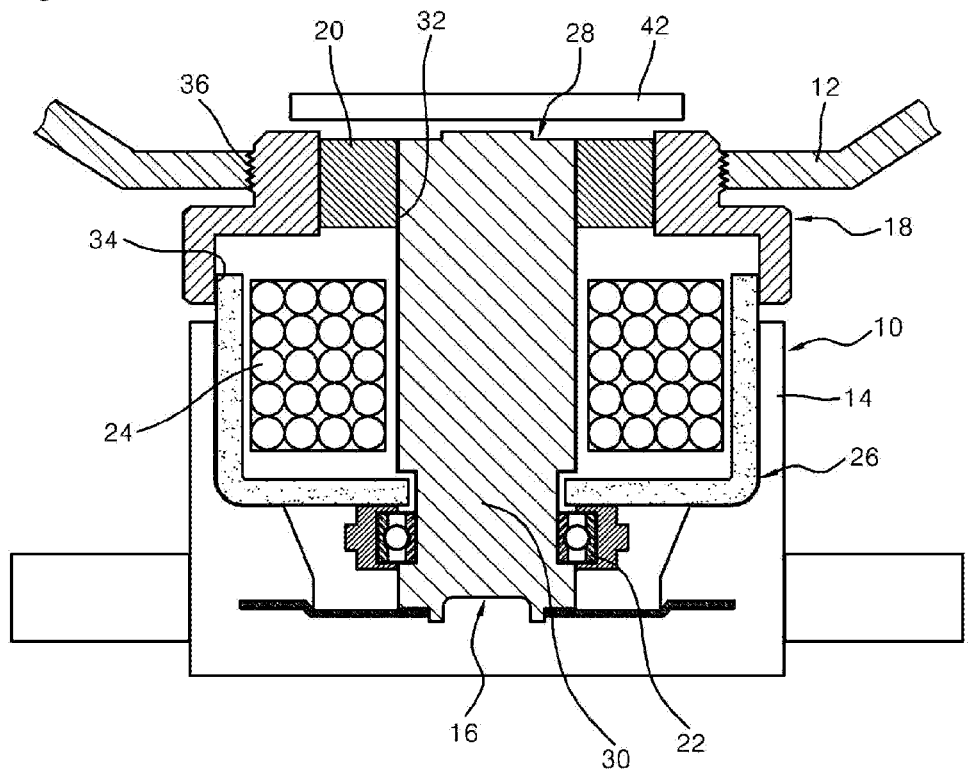
[Fig. 2] Prior Art
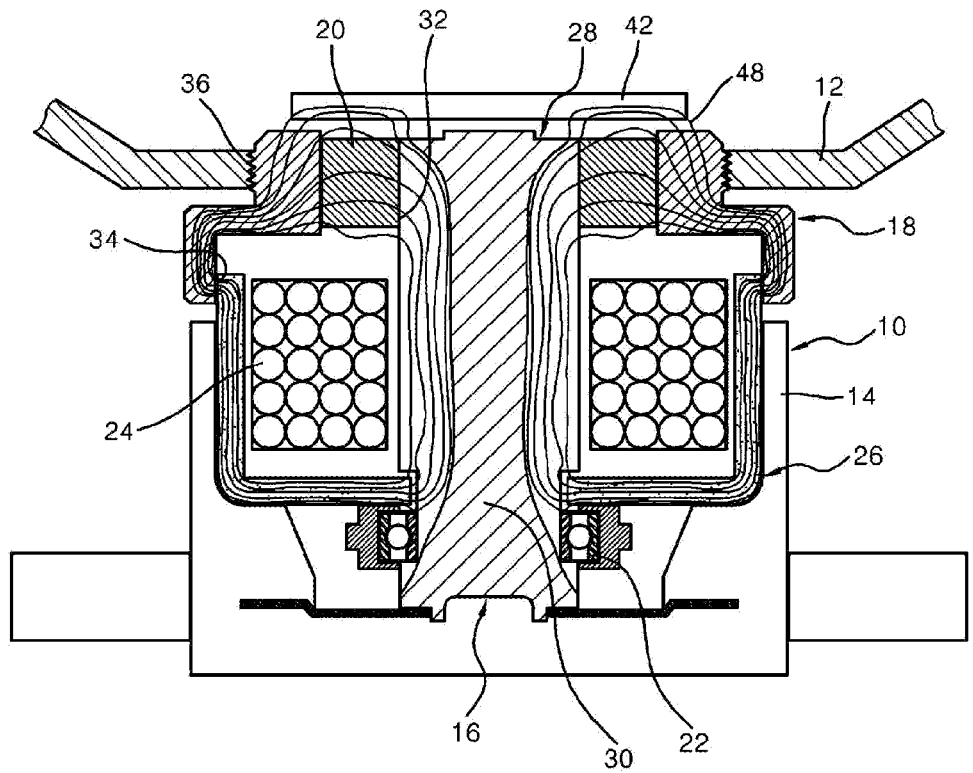

[Fig. 3]
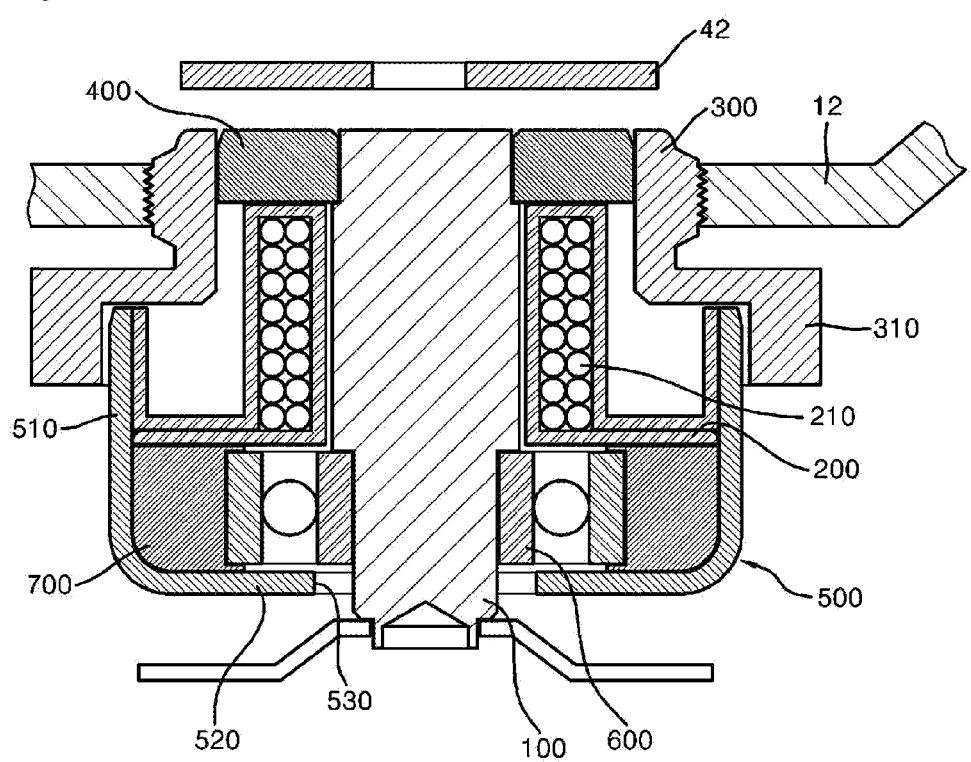

[Fig. 4]
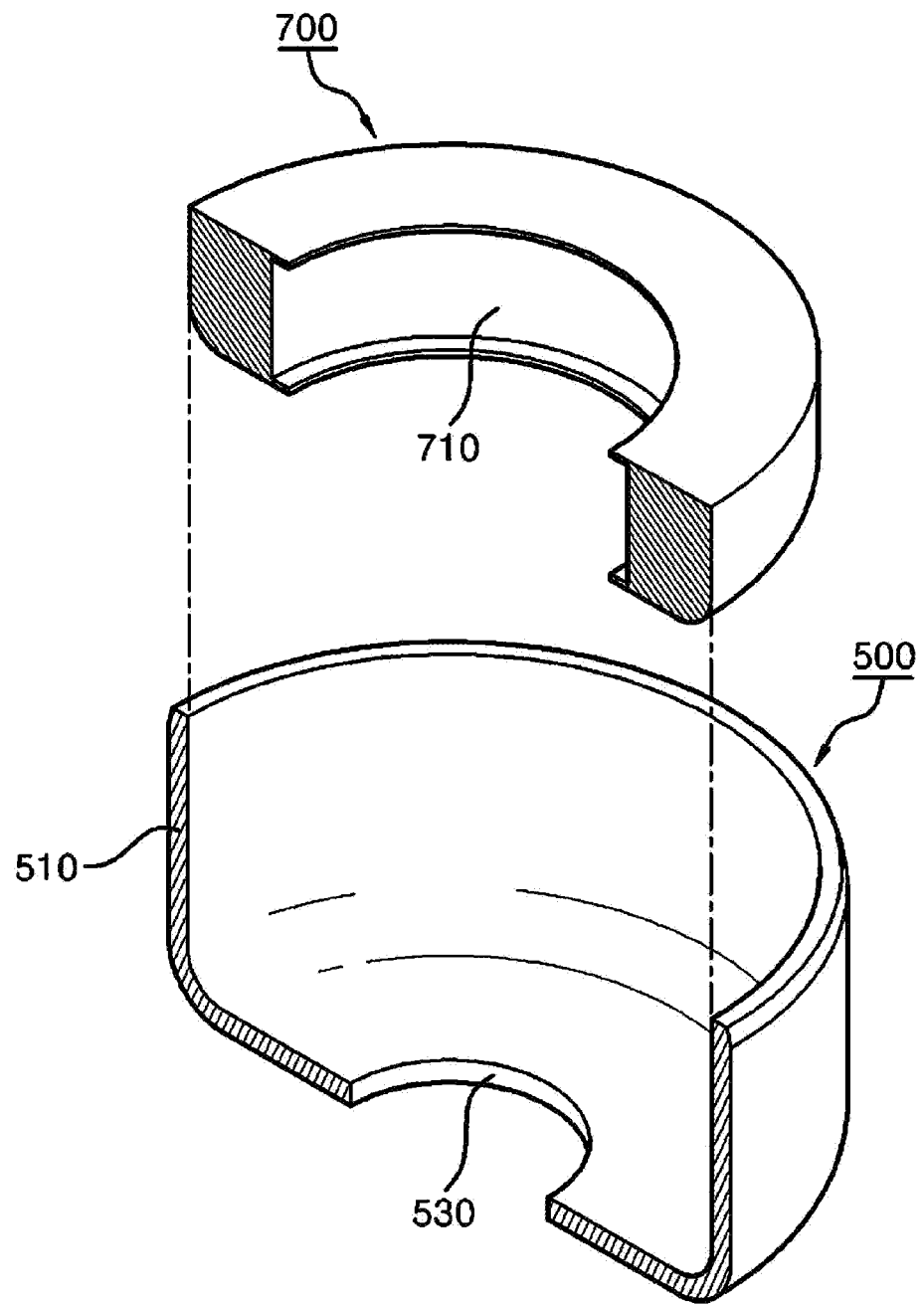

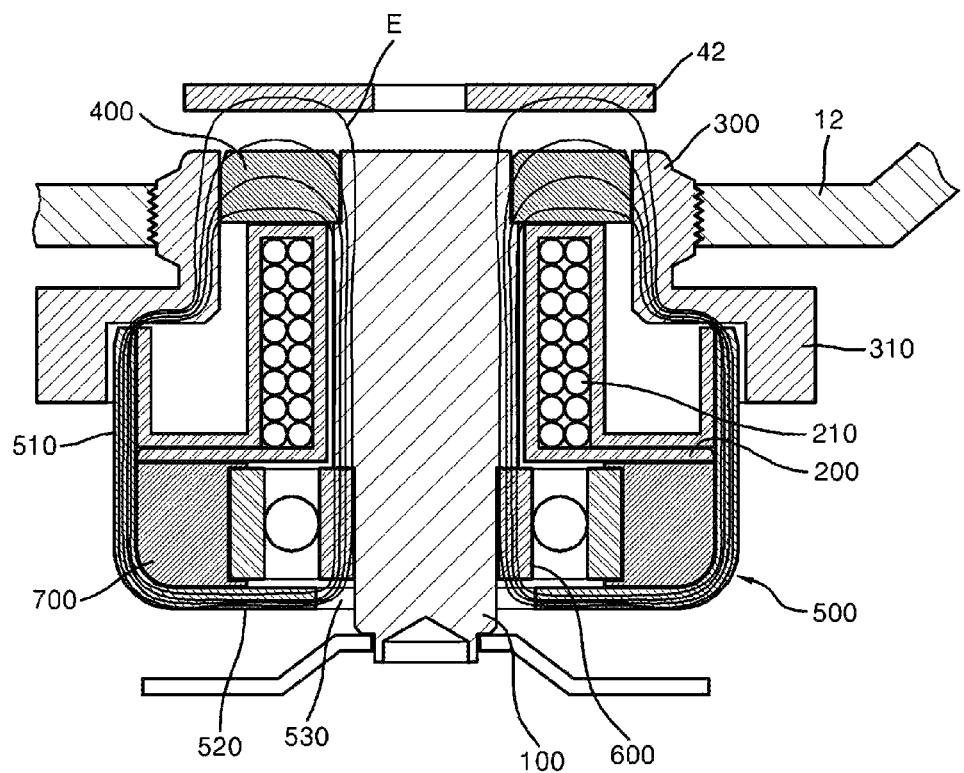
[Fig. 5]

ELECTRONIC ACTUATOR FOR FAN CLUTCH

TECHNICAL FIELD

The present invention relates to an actuator for driving a fan clutch when a viscous fluid is introduced by an electric field generated by current applied to a coil. More particularly, the present invention relates to an electronic actuator allowing electric lines of force to be concentrated along a shaft and having a simplified internal structure which enables compact design of a product and leads to reduction of manufacturing costs.

BACKGROUND ART

A vehicle is generally equipped with a radiator to improve cooling efficiency of a coolant for cooling the engine of the vehicle and a cooling fan to accelerate cooling of the coolant passing through the radiator. The cooling fan is connected with a fluid fan clutch, which receives power transferred via a water pump pulley of the engine and transfers the power to the cooling fan to rotate the cooling fan when the temperature of the radiator is high. The fluid fan clutch is provided with an actuator causing introduction of a viscous fluid. Hereinafter, a conventional actuator will be described in detail with reference to accompanying drawings.

FIG. 1 is a cross-sectional view of a conventional electronic actuator for a fan clutch.

The conventional electronic actuator is formed to generate electric lines of three and is provided with a bearing installed therein. Specifically, FIG. 1 is a cross-sectional view of a viscous fluid clutch actuator, which is a conventional technology disclosed in U.S. Pat. No. 6,557,686 B1 (May 6, 2003). The actuator 10 includes a housing 14, a shall 16, a nut 18, a nonmagnetic bushing 20, a bearing 22, an electrical coil 24, and a ferromagnetic can 26. The rotary shaft 16 includes a first end portion 2$ and a second end portion 30. The first end portion 28 is disposed outside the housing 14, and the second end portion 30 is disposed inside the housing 14 such that the shaft 16 rotates easily in the housing 14. The nut 18 includes an inner peripheral surface 32, an outer peripheral surface 34, and a fastening means 36. The fastening means 36 is adapted to attach the actuator 10 to the clutch 12. When the actuator 10 is attached to the clutch 12, the nut 18 spins with the clutch 12. The stainless steel bushing 20 is adapted to couple the first end portion 28 of the shaft 16 and the inner peripheral surface 32 of the nut 18.

Accordingly, the shaft 16, the hearing 22, and the nut 18 integrally spin with the clutch 12. In addition, the bearing 22 is disposed around the second end portion 30 of the shaft 18 and is adapted to facilitate rotation of the shaft 16. The ferromagnetic can 26 is disposed in a ring shape around the shaft 16. The electrical coil 24 is disposed in the ferromagnetic can 26. The bearing 22 is disposed outside the ferromagnetic can 26 such that a magnetic flux loop 48 is formed inside the bearing 22.

According, to the conventional technology configured as above, when power is applied to the electrical coil 24, the magnetic lines of force 48 are produced through a magnetic body around the coil. The magnetic lines of force 48 produce magnetic force in an air gap present in an armature plate 42. The magnetic force pulls the armature plate 42 inward, from a spring-loaded closed position to an open position. In the open position, the armature plate 42 allows viscous fluid flow and coupling within the clutch 12. In this manner, the actuator 10 actuates the clutch 12. In this manner, the actuator 10 actuates the clutch 12.

However, in the case of the conventional electronic actuator configured for a fan clutch as above, the density of the magnetic lines of force 48 is relatively low and thus the force pulling the armature plate 42 is weak. Moreover, as the bearing 22 is disposed outside the ferromagnetic can 26, shaking of the shaft 18 may be amplified to increase unbalanced load applied to the hearing 22. In addition, since the internal structure of the actuator 10 is complex, compact design of the fan clutch is restricted and the manufacturing costs increase.

DISCLOSURE

Technical Problem

An object of the present invention devised to solve the problem lies in an electronic actuator which may cause electric lines of force to be concentrated along a shaft, reduce unbalanced load applied to the bearing and have a simplified internal structure which enables compact design of a product and leads to reduction of manufacturing costs.

Technical Solution

The object of the present invention can be achieved by providing an electronic actuator for a fan clutch, the electronic actuator comprising a shaft rotated by rotational shares transferred from an engine crankshaft; a bobbin disposed to surround a middle portion of the shaft, the bobbin being provided with a coil wound therein; a nut formed of a magnetic material and dispose to surround one longitudinal side of the shaft, the nut being screwed-coupled to a clutch; an upper bushing formed of a nonmagnetic material and press-fit between the one longitudinal side of the shaft and the nut, the upper bushing integrally connecting the shaft to the nut; a housing formed of a magnetic material and provided with a bottom plate and a side wall to surround the other longitudinal side of the shaft, the side wall extending to partially overlap the nut; a bearing mounted on an outer peripheral surface of the other longitudinal side of the shaft positioned inside the housing; a lower bushing formed of a nonmagnetic material and press-fit between the bearing and the housing, the lower bushing integrally connecting the bearing to the housing.

The bobbin fully surrounds an outer peripheral surface of the shaft exposed between the upper bushing and the bearing, and the coil 110 is wound to occupy an entire interior of the bobbin.

The lower bushing is provided with a seating groove allowing a part of the bearing to be fixedly inserted thereinto.

The nut comprises an extension portion extending away from the shaft and bending toward the housing, wherein an outer snake of the side wall of the housing faces an inner surface of the extension portion.

The bearing is formed of a nonmagnetic material or spaced from the bobbin and the bearing.

A bottom plate of the housing is provided with a center hole, and an end of the other longitudinal side of the shaft protrudes from the housing through the center hole.

Advantageous Effects

With the electronic actuator according to the present invention, electric lines of force may be concentrated along a shaft, and unbalanced load to the shaft may be reduced, and the internal structure may be simplified. Thereby, compact design of a product may be implemented and manufacturing costs may be reduced.

DESCRIPTION OF DRAWINGS

FIG. 1 is a cross-sectional view of a conventional electronic actuator for a fan clutch.

FIG. 2 is a cross-sectional view illustrating a magnetic field pattern of the conventional electronic actuator.

FIG. 3 is a perspective view illustrating an exemplary embodiment of an electronic actuator for a fan clutch in accordance with the present invention.

FIG. 4 is an exploded perspective view illustrating coupling between a lower bushing and a housing included in the present invention.

FIG. 5 is a cross-sectional view illustrating a magnetic field pattern of the electronic actuator in accordance with the present invention.

BEST MODE

Embodiments of an electronic actuator for a fan clutch in accordance with the present invention will now be described in detail with reference to the accompanying drawings.

FIG. 3 is a perspective view illustrating an exemplary embodiment of an electronic actuator for a fan clutch in accordance with the present invention, and FIG. 4 is an exploded perspective view illustrating coupling between a lower bushing and a housing included in the present invention. FIG. 5 is a cross-sectional view illustrating a magnetic field pattern of the electronic actuator in accordance with the present invention.

The electronic actuator according to the present invention is configured to cause introduction of a viscous fluid into a fan clutch for a vehicle. The electronic actuator includes a shaft 100 rotated by a rotational force transferred from an engine crankshaft, a bobbin 200 which is disposed to surround a middle portion of the shaft 100 and provided with a coil 210 wound therein, a nut 300 formed of a magnetic material and disposed to surround one longitudinal side (the upper side in this embodiment) of the shaft 100 with the outer peripheral surface thereof screwed-coupled to a cluster 12, an upper bushing 400 formed of a nonmagnetic material and press-fit between the one longitudinal side of the shaft 100 and the nut 300 to integrally connect the shaft 100 and the nut 300, and a housing 500 formed of a magnetic material and disposed to surround the other longitudinal side (the lower side in this embodiment) of the shaft 100, the housing 500 being provided with a side wall 510 extending to partially overlap the nut 300. The housing 500 includes a bottom plate 520 having a concave shape like a bowl and the side wall 510.

The housing 500 having the shall 100 and the bobbin 200 seated therein is formed of a magnetic material and is positioned to partially overlap the nut 300. When current is applied to the coil 210 wound inside the bobbin 200, magnetic lines of force F are produced along the shaft 100, the housing 500 and the nut 300, as shown in FIG. 5. The magnetic lines of force E form a loop. The magnetic lines of force E formed between the upper side of the nut 300 and the upper side of the chapter 100 arch upwardly and partially reach the armature plate 42, thereby pulling the armature plate 42. The middle portion of the armature plate 42 is provided with a through hole such that the magnetic lines of force E turn away front the through hole to produce greater pulling force. The principles of pulling the armature plate 42 using the magnetic field formed between the shaft 100 and the nut 300 and the relevant constituents are substantially identical to those of the conventional electronic actuator shown in FIGS. 1 and 2, and therefore a detailed description thereof will be skipped.

The outer peripheral surface of the other longitudinal side (the lower side in this embodiment) of the shaft 100 may be provided with a bearing 600 to ensure that the shaft 100 rotates stably without being displaced from the position thereof when rotational force is applied thereto by the crankshaft of the engine. The bearing 600 may be formed of metal with high durability. If the bearing 600 directly contacts the housing 500, the magnetic lines of force may be distributed to the bearing 600, and thus the intensity of the magnetic field may be lowered. To address this issue, a lower bushing 700 formed of a nonmagnetic material may be press-fit between the bearing 600 and the housing 500. As the lower bushing 700 is press-fit between the hearing 600 and the housing 500, the bearing 600 does not directly contact the housing 500, and thus the magnetic lines of force may be prevented from being distributed to the bearing 600.

The bearing 600 of the present invention is characterized in that the bearing 600 is installed at a point of the outer peripheral surface of the shaft 100 which is located inside the housing 500. As the bearing 600 is mounted in the housing 500, the mounting position of the bearing 600 becomes closer to the longitudinal middle portion of the shaft 100. Thereby, shaking of the shaft 100 is attenuated, and unbalanced load applied to the bearing 600 is reduced. As a result, the service life of the bearing 600 may be extended. In addition, as the unbalanced load applied to the bearing 600 is reduced, the bearing 600 can be replaced with a smaller element, and thus compact design of a product is implementable.

As shown in FIG. 3, the bottom plate 520 of the housing 500 is disposed such that the top surface of the bottom plate 520 faces the bottom surface of the bearing 600. The lower side end of the shaft 100 is disposed to protrude from the housing 500 through a center hole 530 formed at the center of the bottom plate 520. Thereby, the size of the housing 500 is minimized, and thus the electronic actuator may become smaller than the conventional electronic actuator shown in FIG. 1.

The inner peripheral surface of the lower bushing 700 may be provided with a seating groove 710 into which a part of the bearing 600 can be fixedly inserted, as shown in FIG. 4. The seating groove 710 is formed in a shape matching the outer side end of the bearing 600 such that the edge portion of the bearing 600 can be inserted into the seating groove 710 in a fitting manner. As the inner peripheral surface of the lower bushing 700 is provided with the seating grove 710 into which the bearing 600 can be inserted, the bearing 600 is fixedly coupled to the inner peripheral surface of the lower bushing 700 such that the bearing 600 is immovable in all directions. Thereby, the bearing 600 does not shake when the shaft 100 rotates. Accordingly, the risk of causing damage to the bearing 600 may be reduced and noise may be significantly attenuated.

As the bearing 600 is partially fitted into the lower bushing 700, the top surface of the lower bushing 700 is positioned higher than the top surface of the bearing 600, and thus the top surface of the bearing 600 does not contact the bobbin 200. In addition, the bottom surface of the lower bushing 700 is positioned lower than the bottom surface of the bearing 600, and thus the bottom surface of the bearing 600 does not contact the bottom plate 520 of the housing 500. Thereby, the magnetic lines of force may be more securely prevented from being distributed through the bearing 600. Of course, the bearing 600 may be formed of a nonmagnetic material to prevent degradation of the intensity of the field mentioned above. However, the bearing 600 is usually made of metal, i.e., a magnetic material, and thus the inner peripheral surface of the lower bushing 700 is preferably provided with the seating groove 710 as described above.

For reference, while this embodiment illustrates that a ball bearing is employed as the bearing 600, the bearing 600 can be replaced by various kinds of other elements which are capable of supporting the shaft 100 such that the shaft 100 does not shake laterally while rotating.

The electronic actuator of the present invention is preferably configured such that the coil 210 surrounds as large a portion of the outer peripheral surface of the shaft 100 between the upper bushing 400 and the bearing 600 as possible rather than surrounding only a part of the outer peripheral surface of the shaft 100. Specifically, the bobbin 200 is preferably disposed to surround the whole outer peripheral surface of the shaft 100 exposed between the upper bushing 400 and the bearing 600, and the coil 210 is preferably wound to occupy the entire interior of the bobbin 200. As a section of the outer peripheral strike of the shaft 100 surrounded by the coil 210 extends in this manner, the magnetic lines of force may be concentrated along the shaft 100, and thus the force pulling the armature plate 42 may increase. In other words, with electronic actuator according to the present invention, the armature plate 42 may be more strongly pulled even with components having the same dimensions as used in the conventional electronic actuator and the same power as applied to the conventional actuator. Therefore, performance may be improved in terms of specifications.

Preferably, an end of the outer side (the side facing the side wall of the housing) of the bobbin 200 extends toward the side wall 510 of the housing 500 and bends upward such that the mounting position of the bobbin 200 in the housing 500 is steadily fixed with the side wall 510 stacked on the bobbin 200.

The detailed description given above is intended to explain exemplary embodiments of the present invention, rather than to show the only embodiments that can be implemented according to the invention. The present invention should be interpreted as defined by the appended claims. It will be apparent to those skilled in the art that various modifications and variations can be made in the present invention without departing from the spirit or scope of the invention.

The invention claimed is:

1. An electronic actuator for a fan clutch, the electronic actuator comprising:
    a shaft rotated by a rotational force transferred from an engine crankshaft;
    an armature plate positioned over the shaft, the armature plate having a through hole in a middle portion thereof;
    a bobbin disposed to surround a middle portion of the shaft, the bobbin being provided with a coil wound therein;
    a nut formed of a magnetic material and disposed to surround one longitudinal side of the shaft, the nut screwed to a clutch;
    an upper bushing formed of a nonmagnetic material and press-fit between the one longitudinal side of the shaft and the nut, the upper bushing integrally connecting the shaft to the nut;
    a housing formed of a magnetic material and provided with a bottom plate and a side wall to surround the other longitudinal side of the shaft, the side wall extending to partially overlap the nut;
    a bearing mounted on an outer peripheral surface of the other longitudinal side of the shaft positioned inside the housing, the bearing positioned inside the housing;
    a lower bushing formed of a nonmagnetic material and press-fit into, and fully filling, a space surrounded by the bearing, the housing, and the bobbin, the lower bushing integrally connecting the bearing to the housing,
    wherein the lower bushing has a first internal projecting edge, a second internal projecting edge, and a seating groove between the first internal projecting edge and the second internal projecting edge, wherein at least part of the bearing fits into the seating groove with the first internal projecting edge and the second internal projecting edge, respectively, positioned over and under the part of the bearing, wherein the bobbin filled with the coil is disposed to surround a whole outer peripheral surface of the shaft exposed between the upper bushing and the bearing which are positioned inside the housing to allow magnetic field lines generated from the coil to form a loop passing along the upper bushing, the shaft, the bearing, and the housing.

2. The electronic actuator of claim 1, wherein the bobbin fully surrounds an outer peripheral surface of the shaft exposed between the upper bushing and the bearing, and the coil is wound to occupy an entire interior of the bobbin.

3. The electronic actuator of claim 1, wherein the bobbin is disposed to cover one side surface of the lower bushing, and the housing is disposed to cover the other side surface of the lower bushing.

4. The electronic actuator of claim 1, wherein the nut comprises an extension portion extending away from the shaft and bending toward the housing,
    wherein an outer surface of the side wall of the housing faces an inner surface of the extension portion.

5. The electronic actuator of claim 1, wherein the bearing is formed of a nonmagnetic material.

6. The electronic actuator of claim 1, wherein a bottom plate of the housing is provided with a center hole, and an end of the other longitudinal side of the shaft protrudes from the housing through the center hole.

7. The electronic actuator of claim 1, wherein the bearing is spaced apart from the bobbin with the first internal projecting edge disposed between the bearing and the housing.

* * * * *